United States Patent [19]

Sawada

[11] Patent Number: 5,433,398
[45] Date of Patent: Jul. 18, 1995

[54] TAPE CASSETTE WITH REEL LOCK MECHANISM

[75] Inventor: Takashi Sawada, Kanagawa, Japan

[73] Assignee: Sony Corporation, Tokyo, Japan

[21] Appl. No.: 212,999

[22] Filed: Mar. 15, 1994

[30] Foreign Application Priority Data

Mar. 15, 1993 [JP] Japan .................................. 5-078520

[51] Int. Cl.$^6$ .......................................... G11B 23/087
[52] U.S. Cl. ................ 242/343.2; 242/338.3; 360/132
[58] Field of Search ............. 242/343.2, 338.3, 338.1, 242/326.1; 354/275; 352/78 R; 360/132

[56] References Cited

U.S. PATENT DOCUMENTS

| 4,288,048 | 9/1981 | Sieben | 242/338.3 |
| 4,635,878 | 1/1987 | Didriksen | 242/338.3 |
| 5,224,005 | 6/1993 | Fujii | 360/132 |

FOREIGN PATENT DOCUMENTS

| 0146311 | 12/1984 | European Pat. Off. . |
| 0169514 | 7/1985 | European Pat. Off. . |
| 0335549 | 3/1989 | European Pat. Off. . |
| 2099400 | 5/1982 | United Kingdom . |

Primary Examiner—John Q. Nguyen
Attorney, Agent, or Firm—Jay H. Maioli

[57] ABSTRACT

A tape cassette having a cassette case; a pair of tape reels rotatably mounted in the cassette case, on which tape reels a magnetic tape is wound, each of the tape reels having a flange formed with an outer circumferential toothed portion; a slide housing slidably mounted in the cassette case and having a hollow portion into which a reel unlocking member provided in a recording and/or reproducing apparatus is inserted when the tape cassette is loaded into the apparatus; and a pair of lock members adapted to releasably engage with the toothed portions of the tape reels, respectively, to lock the tape reels, the lock members being independently rotatably mounted on the slide housing; whereby when the reel unlocking member is inserted into the hollow portion of the slide housing, the slide housing is slid toward an unlocked position to rotate the lock members and thereby disengage the lock members from the toothed portions of the tape reels, thus unlocking the tape reels; a projection is formed on each lock member to engage a respective rib on the slide member to limit the rotation of the lock members.

10 Claims, 11 Drawing Sheets

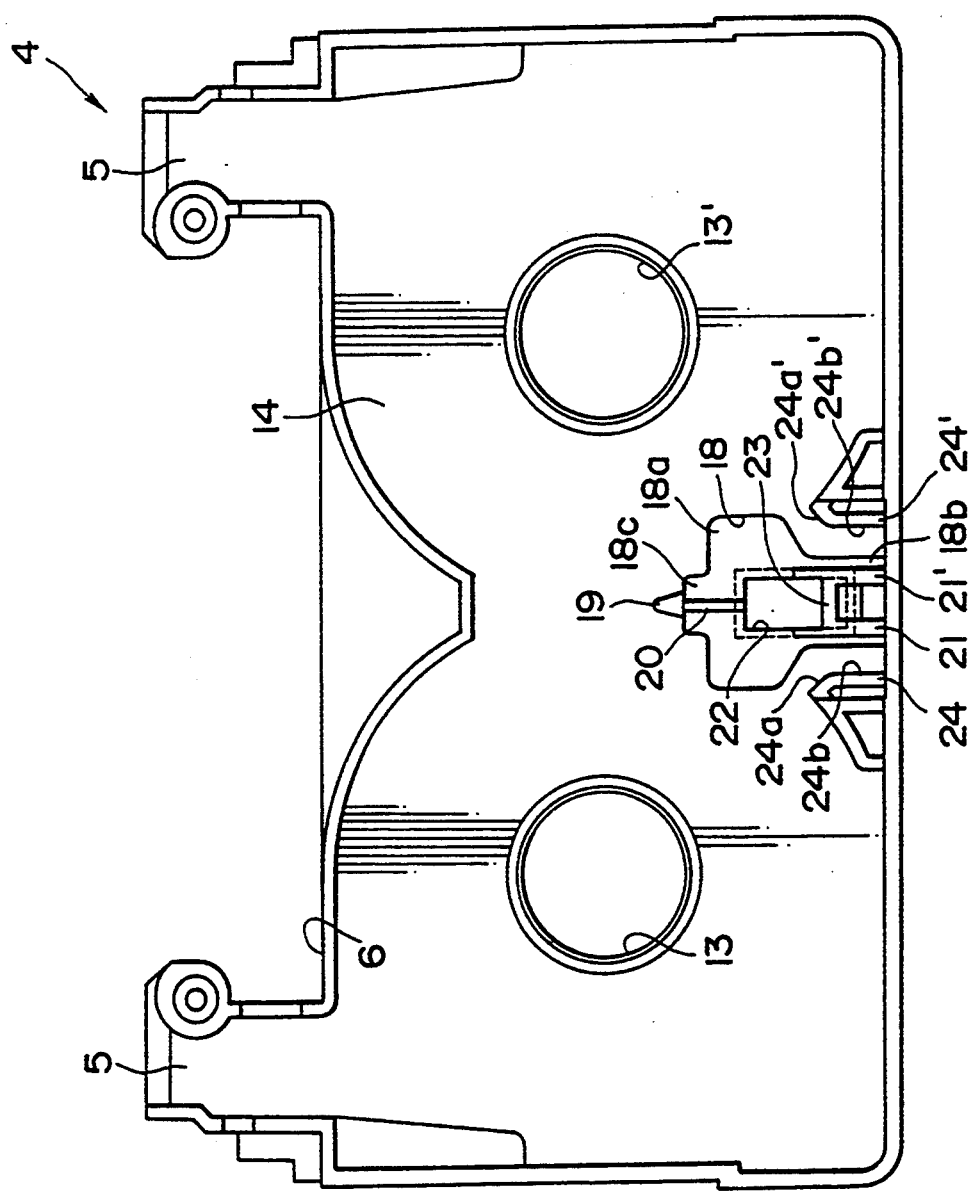
FIG. II

TAPE CASSETTE WITH REEL LOCK MECHANISM

BACKGROUND OF THE INVENTION

1. Field of the Invention

The present invention relates generally to a tape cassette, and more particularly to a tape cassette capable of reliably locking a pair of tape reels on which a tape is wound and also capable of preventing slack of the tape.

2. Description of the Related Art

In a tape cassette having a cassette case and a pair of tape reels rotatably contained in the cassette case, on which tape reels a recording medium such as a magnetic tape is wound, it is necessary to lock the tape reels in an inoperative condition of the tape cassette, so as to prevent the magnetic tape from being unduly unwound from the tape reels. In an 8 mm tape cassette to be used in an 8 mm video tape recorder (VTR), for example, a slide housing having lock members for locking the tape reels is slidably mounted in the cassette case so as to be moved in frontward and rearward directions of the cassette case. The slide housing is resiliently biased in such a direction that the lock members lock the tape reels, and each lock member is integrally formed with a lock pawl engaging with a toothed portion formed on an outer circumference of a flange of each tape reel, thus locking the tape reels to prevent unwanted rotation of the tape reels. When the tape cassette is loaded into the VTR, a reel unlocking member provided in the VTR is inserted into the cassette case through a hole formed through a bottom wall of the cassette case, thereby moving the slide housing against a biasing force applied thereto to disengage the lock pawls of the lock members from the toothed portions of the tape reels, thus unlocking the tape reels.

In the above-mentioned 8 mm tape cassette in the related art, the lock members are integrally formed on the front end of the slide housing, so that the lock pawls of the lock members come into engagement with the toothed portions of the tape reels in a last stage of a stroke of movement of the slide housing during a locking operation. Accordingly, the tape reels are prevented from rotating in tape winding directions by the lock members during the locking operation. That is, the lock members prevent the winding of the tape in case of slackening of the tape. Although winding of the tape can be accomplished by increasing the stroke of movement of the slide housing, the increase in the stroke makes it difficult to reduce the size of the tape cassette. Further, in the event that one of the two tape reels is rotated in the tape slackening direction by a shock to the tape cassette, both the lock members are moved away from the toothed portions of the tape reels. Thus, not only is the lock member having locked the tape reel rotated in the tape slackening direction, but also the other lock member having locked the other tape reel is undesirably released.

SUMMARY OF THE INVENTION

It is accordingly an object of the present invention to provide a tape cassette which can effect engagement of the lock pawls with the toothed portions of the tape reels in a short stroke of the slide housing and rotate the tape reels in the tape winding directions by the movement of the slide housing.

It is another object of the present invention to provide a tape cassette which can prevent disengagement of both the lock pawls from the toothed portions of the tape reels at the same time.

According to the present invention, there is provided a tape cassette having a cassette case; a pair of tape reels rotatably mounted in the cassette case, on which tape reels a magnetic tape is wound, each of the tape reels having a flange formed with an outer circumferential toothed portion; a slide housing slidably mounted in the cassette case and having a hollow portion into which a reel unlocking member provided in a recording and/or reproducing apparatus is inserted when the tape cassette is loaded into the apparatus; and a pair of lock members adapted to releasably engage with the toothed portions of the tape reels, respectively, to lock the tape reels, the lock members being independently rotatably mounted on the slide housing; whereby when the reel unlocking member is inserted into the hollow portion of the slide housing, the slide housing is slid toward an unlocked position to rotate the lock members and thereby disengage the lock members from the toothed portions of the tape reels, thus unlocking the tape reels. A projection is formed on each lock member to engage a respective rib on the slide member to limit the rotation of the lock members.

With this construction of the present invention, the pair of lock members are mounted on the slide housing so that the lock members can be rotated independently of each other. Accordingly, the slide housing can be moved in a short stroke, and the lock members can engage with the toothed portions of the tape reels at an early stage of the short stroke. After the lock members engage with the toothed portions, the slide housing is further moved to rotate the tape reels in tape winding directions through the lock members. Moreover, even when one of the tape reels is rotated in its tape slackening direction by a shock, only the lock member having engaged with the toothed portion of the tape reel thus rotated is rotated in such a direction as to disengage from the toothed portion, and has no influence upon the other lock member. That is, the other lock member is prevented from being unlocked.

Other objects and features of the invention will be more fully understood from the following detailed description of a preferred embodiment and appended claims when taken with the accompanying drawings.

BRIEF DESCRIPTION OF THE DRAWINGS

FIG. 11 is a top plan view of a lower half constituting a cassette case of the tape cassette.

DETAILED DESCRIPTION OF THE PREFERRED EMBODIMENT

Figure 1:
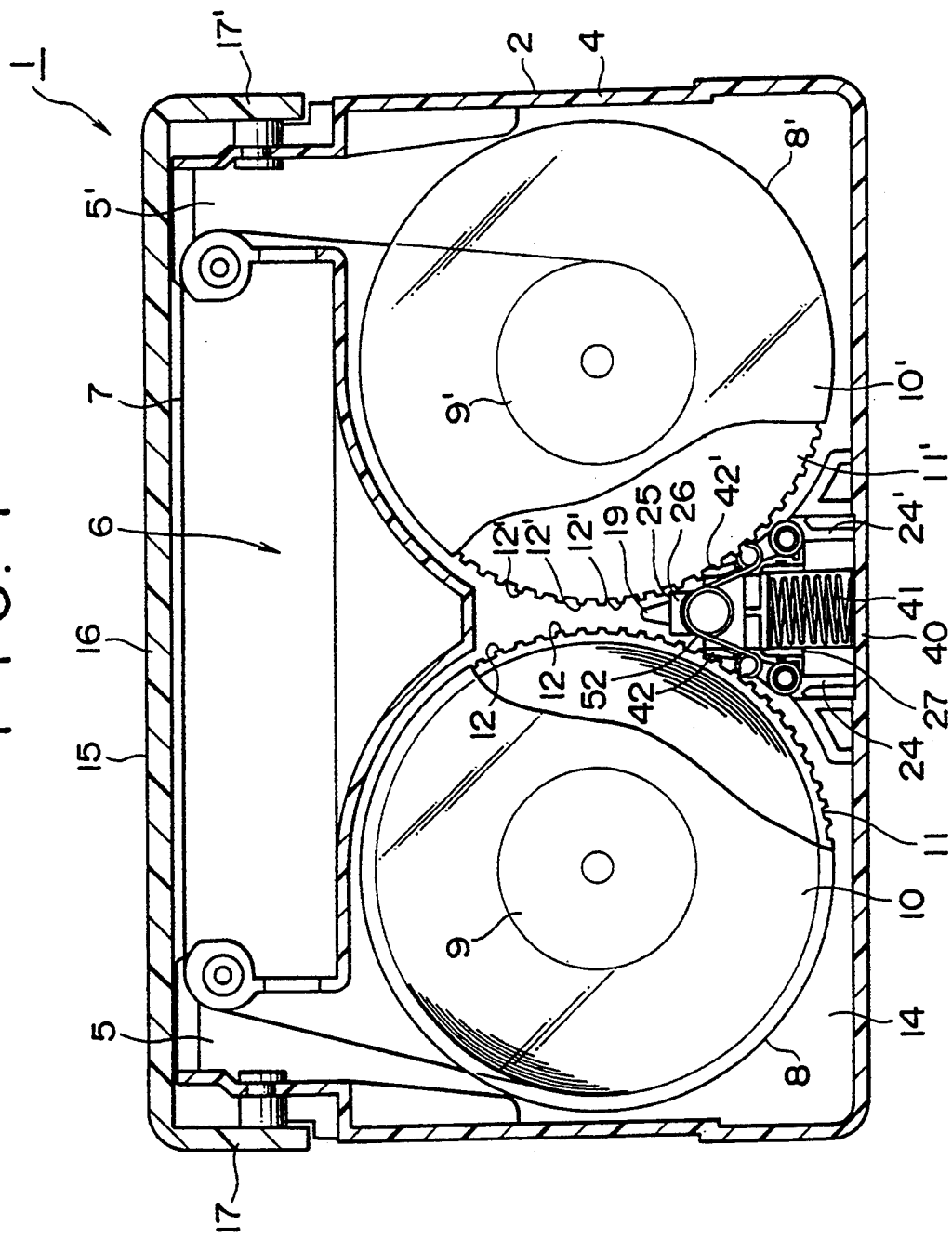
FIG. 1 is a horizontal sectional view in top plan of a tape cassette according to a preferred embodiment of the present invention.
Figure 2:
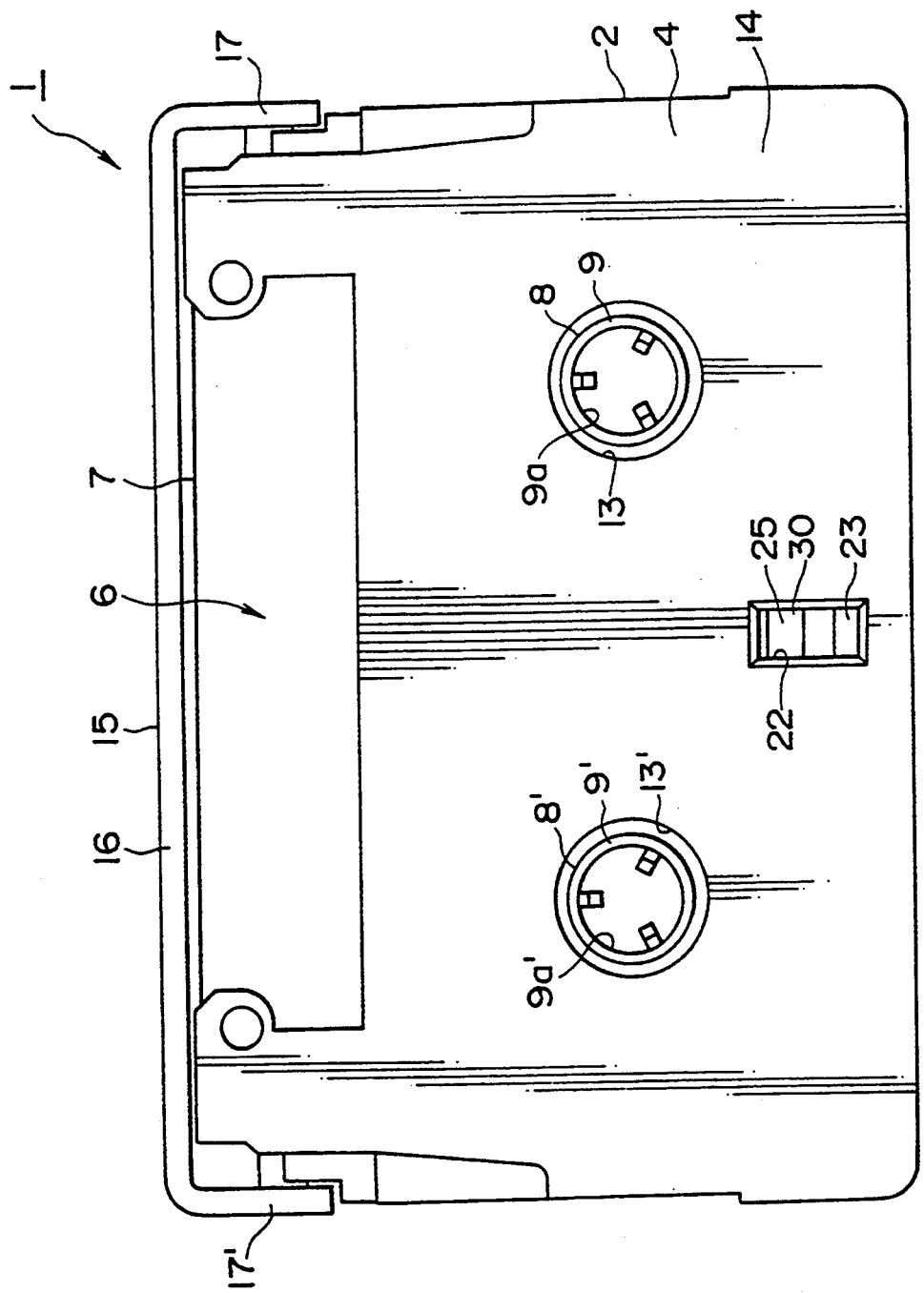
FIG. 2 is a bottom plan view of the tape cassette.

Referring to FIGS. 1 and 2, reference numeral 1 generally designates a tape cassette according to a preferred embodiment of the present invention. The tape cassette 1 includes a cassette case 2 formed of synthetic resin. The cassette case 2 is rectangular and oblong in a lateral direction thereof as viewed in plan, and has a relatively small dimension in height. The cassette case 2 is composed of an upper half (not shown) and a lower half 4 connected together in a butting fashion.

A pair of tape outlets 5 and 5' are formed at the laterally opposite end portions of the front surface of the cassette case 2, and a mouth portion 6 is formed between the tape outlets 5 and 5' so as to open at least frontward and downward. The mouth portion 6 is a portion into which a tape loading member provided in a recording and/or reproducing apparatus, e.g., a video tape recorder, is inserted to draw a magnetic tape 7 from the cassette case 2 and position the magnetic tape 7 in a given path when the tape cassette 1 is loaded into the recording and/or reproducing apparatus.

A pair of tape reels 8 and 8' for winding the magnetic tape 7 is rotatably contained in the cassette case 2. When the tape cassette 1 is in an operative condition, the magnetic tape 7 is partially drawn from the tape outlets 5 and 5' to the outside of the cassette case 2, whereas when the tape cassette 1 is in an inoperative condition, the magnetic tape 7 is partially positioned so as to extend along the front surface of the mouth portion 6. The tape reels 8 and 8' are generally constructed of cylindrical reel hubs 9 and 9' closed at their upper ends, disk-shaped upper flanges 10 and 10' projecting sideward from the upper ends of the reel hubs 9 and 9', and disk-shaped lower flanges 11 and 11' projecting sideward from the lower ends of the reel hubs 9 and 9', respectively. The reel hubs 9 and 9' are formed with cylindrical holes 9a and 9a' opening downward, respectively. The cylindrical holes 9 and 9' are designed to engage with reel rotating members (not shown), respectively, when the tape cassette 1 is loaded into the recording and/or reproducing apparatus.

As shown in FIGS. 1 and 2, a plurality of teeth 12 and 12' are formed on the whole outer circumferences of the lower flanges 11 and 11', respectively. As shown in FIGS. 2 and 11, a pair of circular openings 13 and 13' for respectively receiving the reel rotating members are formed through a bottom wall 14 of the cassette case 2 in such a manner as to be aligned with the cylindrical holes 9a and 9a' of the tape reels 8 and 8', respectively. Thus, the cylindrical holes 9a and 9a' are exposed through the circular openings 13 and 13' to the outside of the cassette case 2, respectively.

A front lid 15 is vertically rotatably connected to the cassette case 2 at a front end portion thereof. The front lid 15 is composed of a front portion 16 normally covering the front surface of the cassette case 2 and a pair of side portions 17 and 17' projecting rearward from the laterally opposite ends of the front portion 16. The side portions 17 and 17' are rotatably connected to the side walls of the cassette case 2 at the front end portion thereof. The front lid 15 is rotated in an angular range between a closed position where the front portion 16 covers the front surface of the cassette case 2 and an open position where the front portion 16 is raised to expose the front surface of the cassette case 2 to the outside thereof. The front lid 15 is normally biased by resilient means (not shown) toward the closed position.

Figure 3:
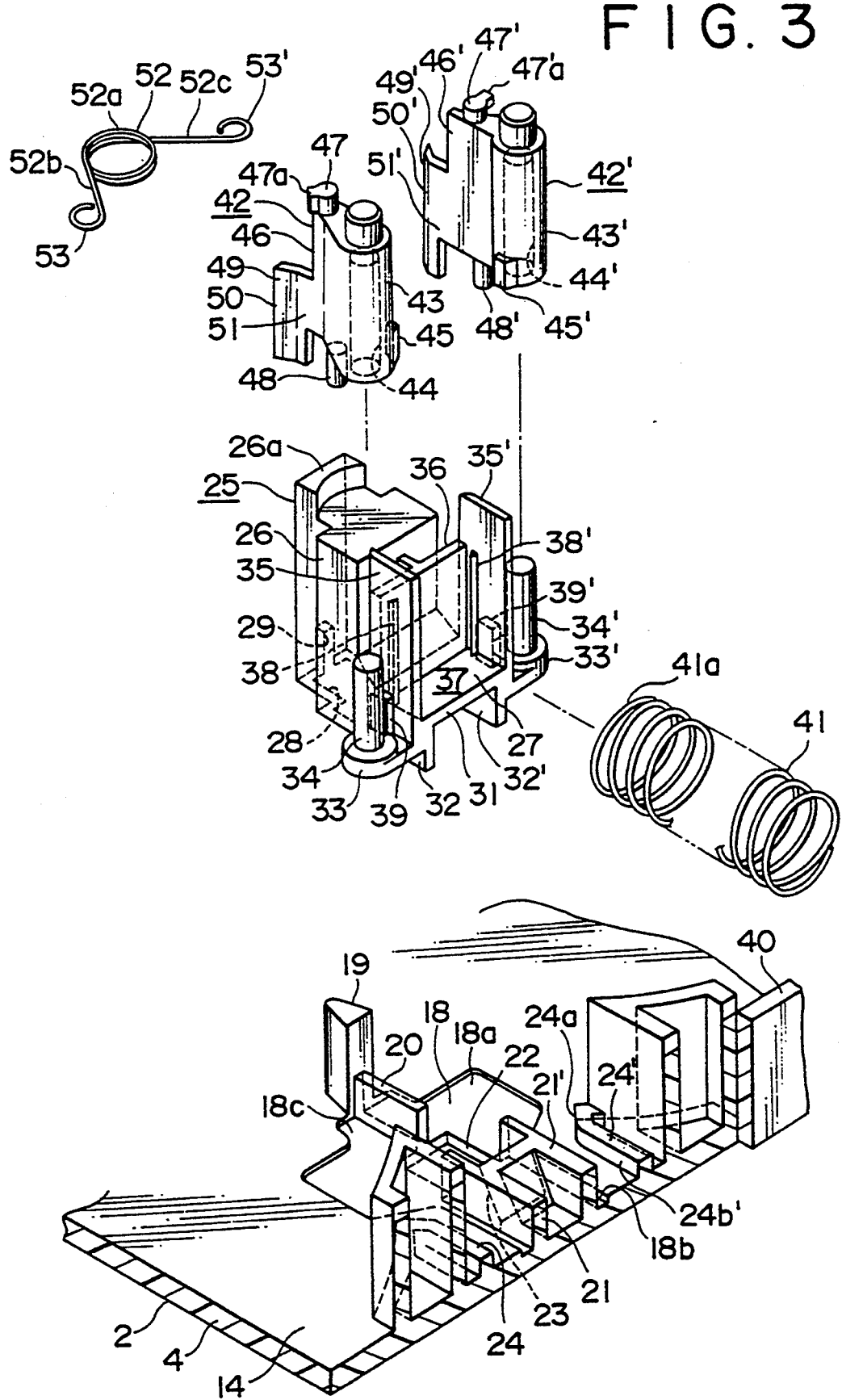
FIG. 3 is an exploded, enlarged perspective view of an essential part of the tape cassette.
Figure 4:
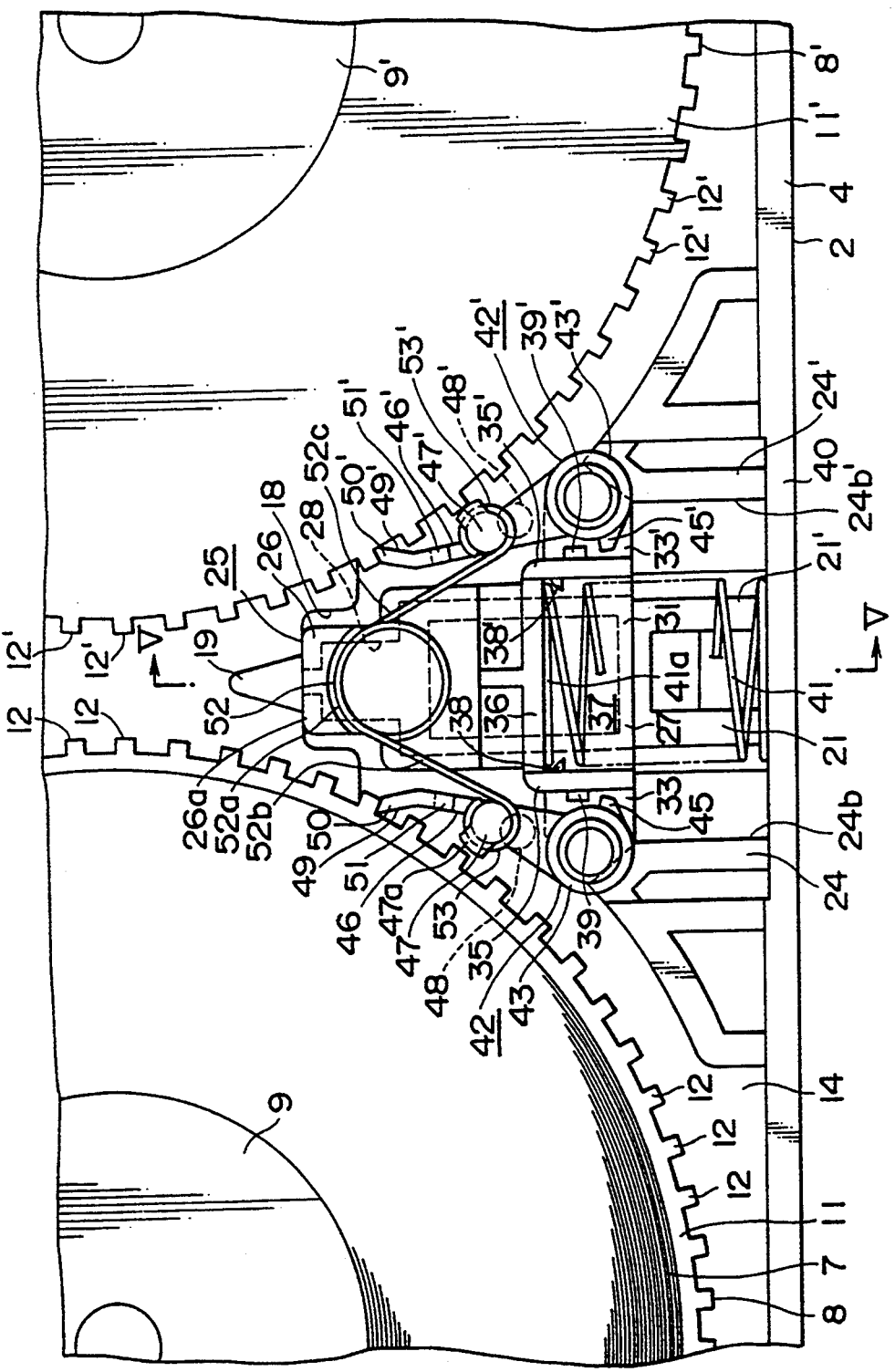
FIG. 4 is an enlarged plan view of the essential part in the condition where tape reels are kept locked.
Figure 5:
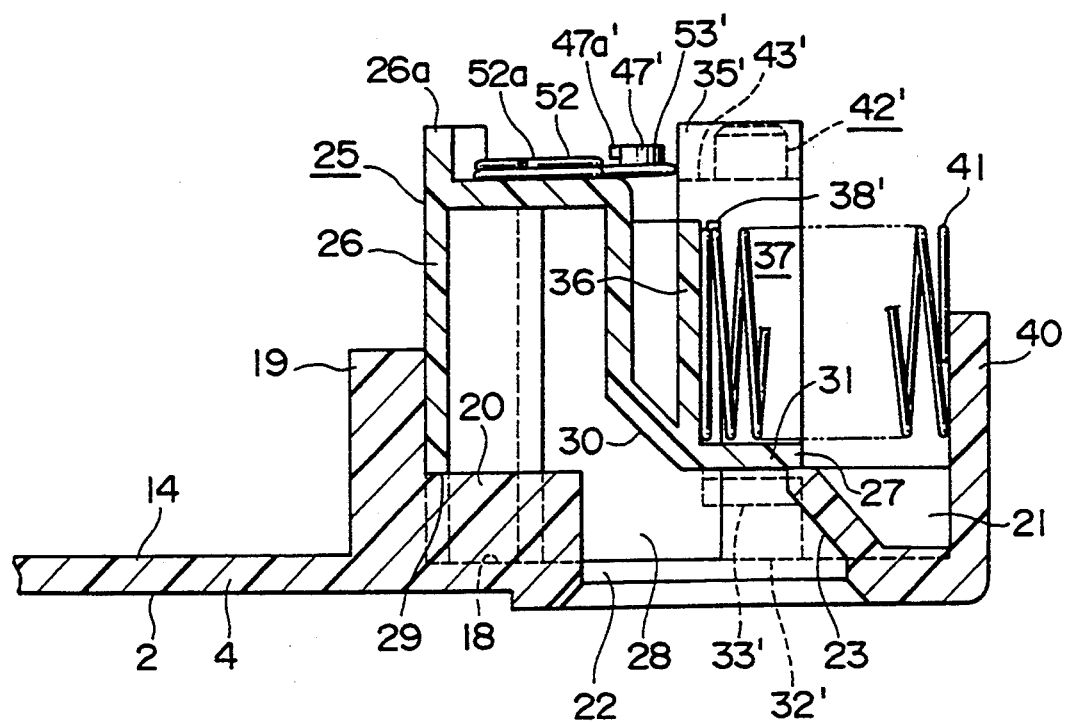
FIG. 5 is a cross section taken along the line V—V in FIG. 4.
Figure 6:
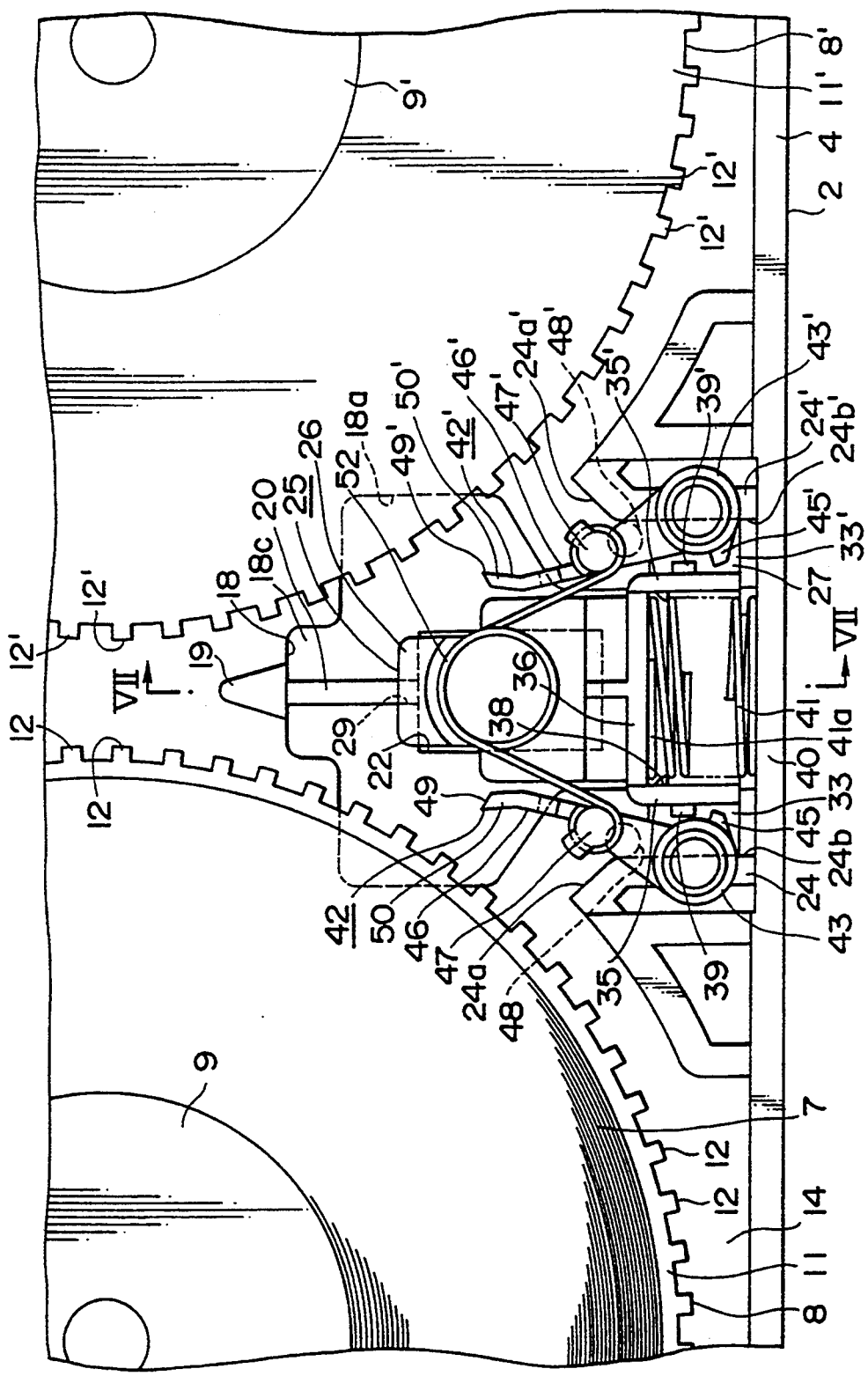
FIG. 6 is an enlarged plan view of the essential part in the condition where the tape reels are kept unlocked.

As shown in FIGS. 3, 4, and 5, a shallow recess 18 is formed on the inner surface of the bottom wall 14 of the cassette case 2 at a laterally central, rear end portion thereof. The shallow recess 18 is composed of a front half portion 18a and a rear half portion 18b. The front half portion 18a has a width slightly greater than a value twice a width of the rear half portion 18b. The front edge of the front half portion 18a is recessed frontward at its laterally central position to form an indent portion 18c having a width about ⅓ of the width of the front half portion 18a. As shown in FIG. 6, the laterally opposite end portions of the front half portion 18a are so located as to lie under the tape reels 8 and 8'.

A front stopper 19 is formed to stand on the inner surface of the bottom wall 14 at a position adjoining to the lateral center of the front edge of the indent portion 18c of the shallow recess 18. A platelike guide rib 20 is formed to stand on the bottom surface of the front half portion 18a of the shallow recess 18 and extend from the rear surface of the front stopper 19 to a central position of the front half portion 18a in a longitudinal direction of the cassette case 2. The guide rib 20 has a height slightly less than the half of a height of the front stopper 19.

A pair of guide walls 21 and 21' are formed to stand on the bottom surface of the rear half portion 18b of the shallow recess 18 and extend from the inner surface of a rear wall 40 of the lower half 2 to a front end position of the rear half portion 18b in the longitudinal direction of the cassette case 2. The guide walls 21 and 21' are spaced a little from the side edges of the rear half portion 18b. The guide walls 21 and 21' have the same height, and it is substantially equal to the height of the guide rib 20.

A rectangular hole 22 elongated in the longitudinal direction of the cassette case 2 is formed through the bottom wall 14 in the shallow recess 18 at a substantially central portion thereof so as to extend from a position adjoining to the rear end of the guide rib 20 to a substantially longitudinally central position of the rear half portion 18b. The rectangular hole 22 is designed so that a reel unlocking member 54 (see FIGS. 7 and 9) provided in the recording and/or reproducing apparatus may be inserted through the rectangular hole 22 into the cassette case 2. An inclined wall 23 is formed on the inner surface of the bottom wall 14 between the guide walls 21 and 21' so as to rise obliquely frontward from the rear end of the rectangular hole 22 to a position near the front ends of the guide walls 21 and 21'.

A pair of cam ribs 24 and 24' are formed on the inner surface of the bottom wall 14 so as to extend generally in the longitudinal direction of the cassette case 2 and be spaced laterally from the side edges of the rear half portion 18b of the shallow recess 18. The cam ribs 24 and 24' are composed of front inclined portions 24a and 24a' and remaining straight portions 24b and 24b' extending rearward from the rear ends of the front inclined portions 24a and 24a', respectively. The front inclined portions 24a and 24a' are inclined in the lateral direction of the cassette case 2 so as to diverge frontward in such a manner that the space between the front inclined portions 24a and 24a' is gradually increased in the frontward direction.

Reference numeral 25 generally designates a slide housing slidably supported on the inner surface of the bottom wall 14 in the shallow recess 18 in such a manner as to be slidable in the longitudinal direction of the cassette case 2 within the range of the shallow recess 18. The slide housing 25 is integrally formed of synthetic resin, and it is generally composed of a vertically extending, rectangular blocklike main portion 26 and a substantially horizontal, platelike support portion 27 extending rearward from the rear end of the main portion 26. A hollow portion 28 is defined inside the main portion 26 so as to open at the lower end of the main portion 26, and a slit 29 is formed through the front wall of the main portion 26 at a laterally central position thereof so as to open at the lower end and communicate with the hollow portion 28. The rear wall of the main portion 26 has a lower end higher in level than the lower end of the slide housing 25. An inclined portion 30 extends obliquely downward from the lower end of the rear wall of the main portion 26 to the front end of the support portion 27.

A projection 26a is formed on the upper surface of the main portion 26 at a front end thereof over the width thereof. The projection 26a has an rear surface arcuately concaved.

The support portion 27 is formed in an invertedly U-shaped configuration as viewed in rear elevation. The support portion 27 is generally composed of an upper wall 31 extending rearward from the lower end of the inclined portion 30 of the main portion 26 and a pair of side walls 32 and 32' extending downward from the laterally opposite ends of the upper wall 31. The lower ends of the side walls 32 and 32' are of the same level as that of the lower end of the main portion 26.

A pair of support tongues 33 and 33' project sideward from the outer side surfaces of the side walls 32 and 32' at substantially vertically central positions thereof, respectively. A pair of support pins 34 and 34' project upwardly from the upper surfaces of the support tongues 33 and 33', respectively.

A pair of vertical walls 35 and 35' project upwardly from the base ends of the support tongues 33 and 33', respectively, and a vertical wall 36 projects upwardly from the front end of the upper wall 31 of the support portion 27. Thus, a spring receiving space 37 open on the rear and upper sides is defined by the vertical walls 35, 35', and 36 and the upper wall 31 of the support portion 27. A pair of vertically extending ribs 38 and 38' are formed on the opposed inner surfaces of the vertical walls 35 and 35', respectively, so as to be spaced rearward from the vertical wall 36. Further, a pair of stopper ribs 39 and 39' are formed on the outer surfaces of the vertical walls 35 and 35' at the lower end portions thereof, respectively.

As mentioned above, the slide housing 25 is slidably supported on the inner surface of the bottom wall 14 of the cassette case 2 within the shallow recess 18 so as to be slidable in the longitudinal direction of the cassette case 2. The slit 29 formed through the front wall of the main portion 26 of the slide housing 25 is in slidable engagement with the guide rib 20 formed on the inner surface of the bottom wall 14, and the opposed inner surfaces of the side walls 32 and 32' of the support portion 27 of the slide housing 25 are in slidable contact with the outer surfaces of the guide walls 21 and 21' formed on the inner surface of the bottom wall 14.

Thus, the slide housing 25 is guided by the guide rib 20 and the guide walls 21 and 21' during sliding movement. The sliding movement of the slide housing 25 is limited with a given stroke between a front stop position where the front surface of the main portion 26 is in abutment against the rear surface of the front stopper 19 and a rear stop position where the rear end of the support portion 27 is in abutment against the inner surface of the rear wall 40 of the lower half 4.

A coil spring 41 is situated in the spring receiving space 37 defined in the slide housing 25 under compression between the vertical wall 36 and the rear wall 40. A front end ring 41a of the coil spring 41 is engaged within the spaces between the vertical wall 36 and the ribs 38. Accordingly, the slide housing 25 is normally biased frontward by the coil spring 41. In the condition where no force for rearwardly moving the slide housing 25 is applied to the slide housing 25, the slide housing 25 is kept in the front stop position where the front surface of the main portion 26 is in abutment against the rear surface of the front stopper 19. This position of the slide housing 25 corresponds to a locked position.

A pair of reel lock members 42 and 42' are rotatably connected to the slide housing 25. The reel lock members 42 and 42' are symmetrical in shape and operation with respect to a longitudinal center line of the slide housing 25; so the following description will be directed to the reel lock member 42 only and the description relating to the other reel lock member 42' will be omitted with a prime "'" suffixed to the parts associated therewith.

The reel lock member 42 has a substantially cylindrical base portion 43. The base portion 43 is formed with a cylindrical hole 44 opening downward. The support pin 34 of the slide housing 25 is inserted in the cylindrical hole 44 of the base portion 43 of the reel lock member 42 so as to allow rotation of the reel lock member 42. Thus, the reel lock member 42 is rotatably connected to the support pin 34 and situated on the support tongue 33 of the slide housing 25.

A projection 45 is formed on the outer circumferential surface of the base portion 43 at a lower end portion thereof so as to face the outer surface of the vertical wall 35 of the slide housing 25 behind the stopper rib 39. The projection 45 is designed to abut against the stopper rib 39. An arm portion 46 projects substantially frontward from the base portion 43, and a spring retainer 47 projects upward from the upper surface of the arm portion 46. A stop 47a projects sideward from the outer circumference of the spring retainer 47 at an upper end portion thereof. A control pin 48 projects downward from the lower surface of the arm portion 46 at a position near the front end of the arm portion 46. A platelike lock pawl 49 extends frontward from the front end of the arm portion 46. The lock pawl 49 is composed of a main portion 50 bent obtusely as viewed in plan and a connecting portion 51 projecting rearward from the rear end of the main portion 50 at an upper half portion thereof. The rear end of the connecting portion 51 is connected with the front end of the arm portion 46 at a lower half portion thereof.

The support pins 34 and 34' of the slide housing 25 are inserted in the cylindrical holes 44 and 44' of the base portions 43 and 43' of the reel lock members 42 and 42', respectively. Thus, the reel lock members 42 and 42' are independently rotatably connected to the support tongues 33 and 33' of the slide housing 25. In this condition, the projections 45 and 45' of the reel lock members 42 and 42' are situated behind the stopper ribs 39 and 39' of the slide housing 25 at substantially the same level.

Reference numeral 52 generally designates a torsion spring designed to be connected to the reel lock members 42 and 42' and the slide housing 25. The torsion spring 52 is composed of a central coil portion 52a, a pair of arms 52b and 52c extending from the coil portion 52a, and a pair of rings 53 and 53' formed at the free ends of the arms 52b and 52c, respectively. The rings 53 and 53' of the torsion spring 52 are fitted with the spring retainers 47 and 47' of the reel lock members 42 and 42', respectively. The coil portion 52a of the torsion spring 52 is situated on the upper surface of the main portion 26 of the slide housing 25.

The reel lock members 42 and 42' are normally biased by the torsion spring 52 in such directions that the front ends of the reel lock members 42 and 42' are moved away from each other. In the condition prior to installing the slide housing 25 with the reel lock members 42 and 42' and the torsion spring 52 connected thereto into the cassette case 2, the projections 45 and 45' of the reel lock members 42 and 42' are kept in abutment against the rear surfaces of the stopper ribs 39 and 39' of the slide housing 25 by the biasing force of the torsion spring 52, thereby functioning to limit rotation of the reel lock members 42 and 42' in the opposite directions such that the front ends of the reel lock members 42 and 42' are moved away from each other. In this manner, the slide housing 25, the reel lock members 42 and 42', and the torsion spring 52 can be handled as a unit, and the positional relation of the reel lock members 42 and 42' to the slide housing 25 is kept fixed prior to the installation. Accordingly, the installation of these parts can be easily performed.

In operation, when the slide housing 25 supporting the coil spring 41, the reel lock members 42 and 42', and the torsion spring 52 is installed into the cassette case 2, the slide housing 25 is set in the locked position by the biasing force of the coil spring 41, and the lock pawls 49 and 49' of the reel lock members 42 and 42' are brought into engagement with the teeth 12 and 12' of the tape reels 8 and 8' by the biasing force of the torsion spring 52, respectively. Thus, the rotation of the tape reels 8 and 8' is locked.

Figure 8:
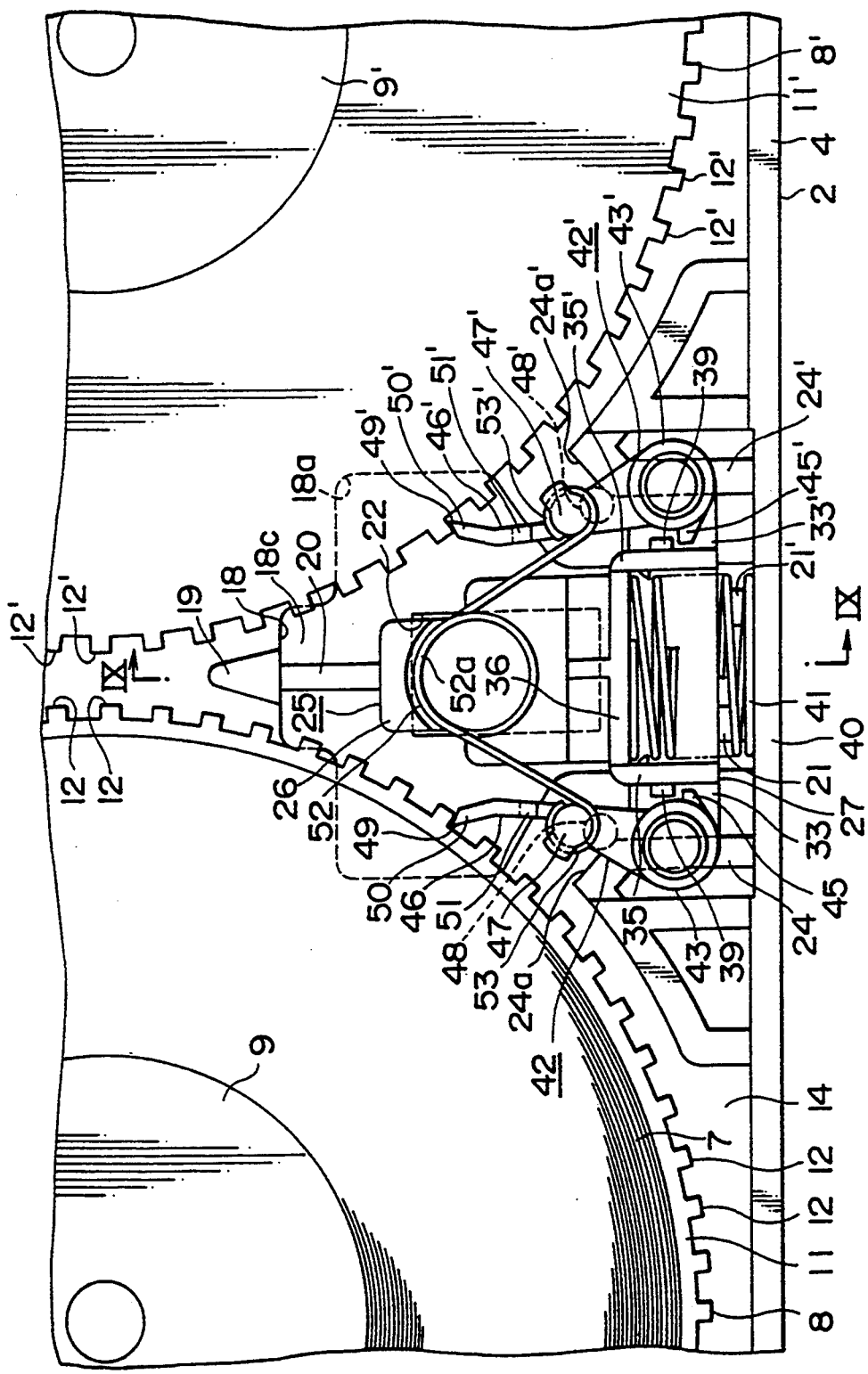
FIG. 8 is an enlarged plan view of the essential part in the condition where the tape reels have just been locked.
Figure 9:
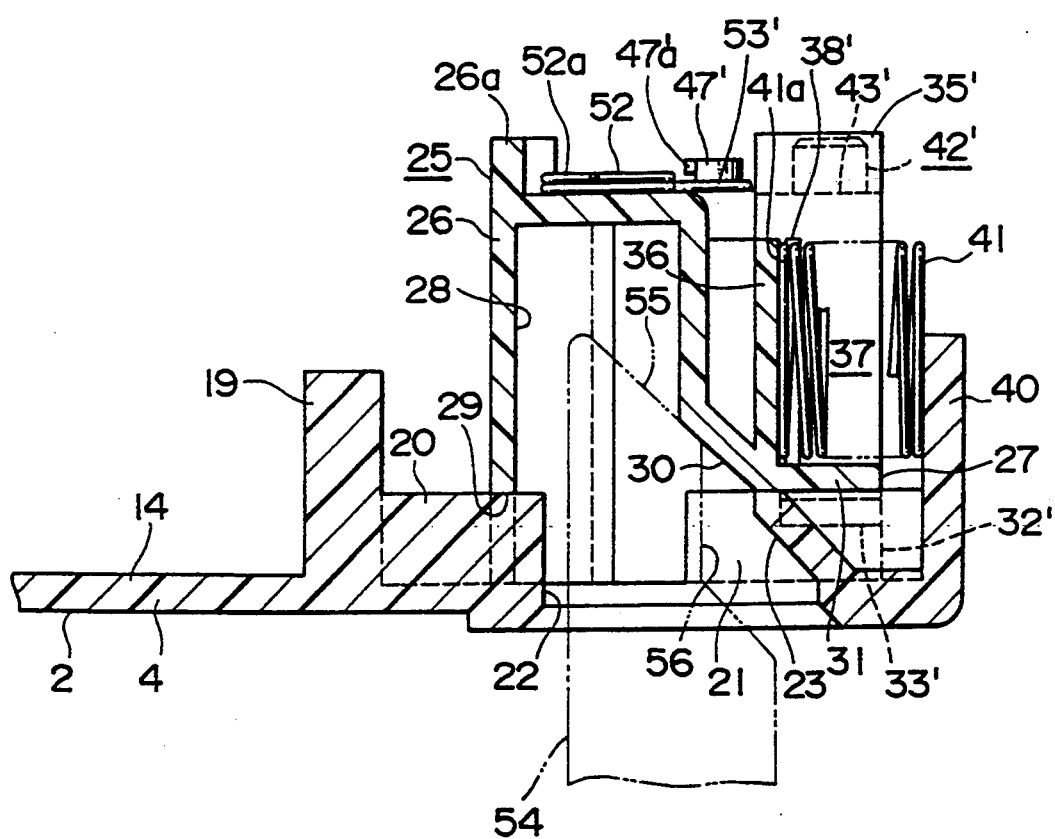
FIG. 9 is a cross section taken along the line IX—IX in FIG. 8.

When the tape cassette 1 is loaded into a video tape recorder (VTR), the reel unlocking member 54 provided in the VTR is inserted from the rectangular hole 22 of the bottom wall 14 of the lower half 4 into the cassette case 2 as shown in FIGS. 8 and 9.

The reel unlocking member 54 has an inclined surface 55 inclined downward from the top of the member 54. During the course of insertion of the reel unlocking member 54 into the cassette case 2, the inclined surface 55 of the reel unlocking member 54 first comes into contact with the lower surface of the inclined portion 30 of the slide housing 25. Thereafter, the inclined surface 55 urges the lower surface of the inclined portion 30 to impart a rearward force to the slide housing 25. Accordingly, the slide housing 25 is moved rearward against the biasing force of the coil spring 41.

Figure 7:
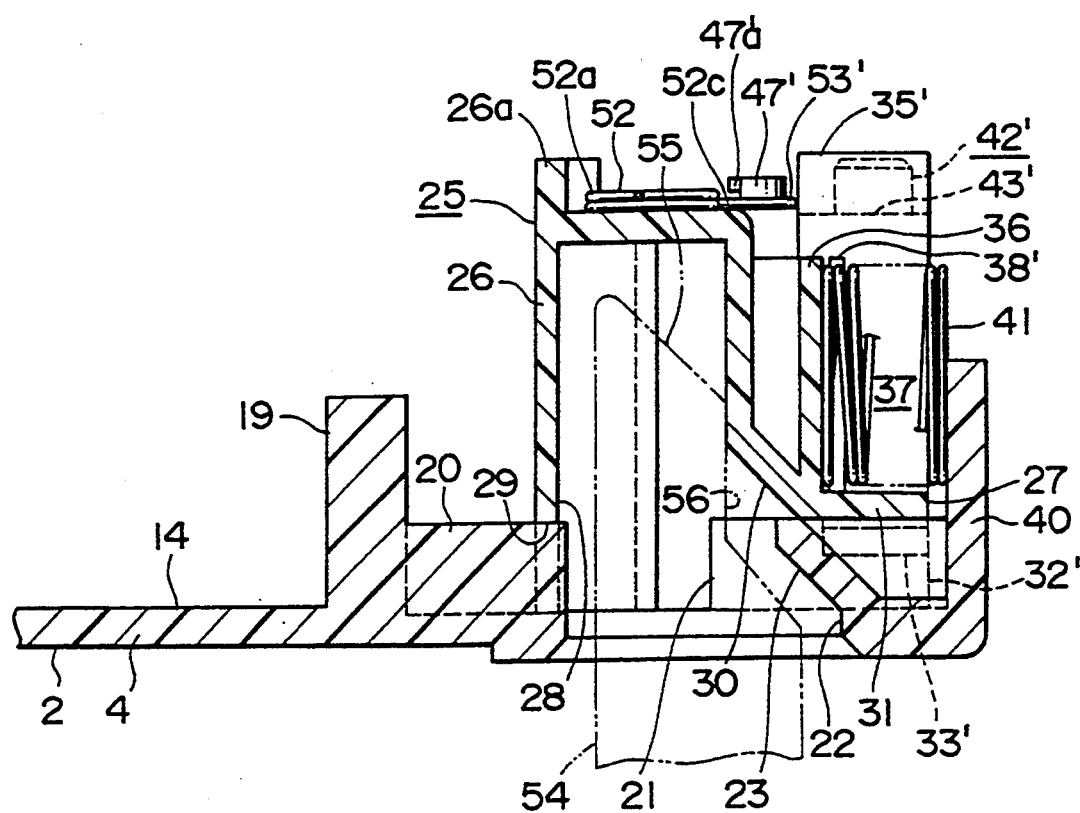
FIG. 7 is a cross section taken along the line VII—VII in FIG. 6.

During the rearward movement of the slide housing 25, the control pins 48 and 48' of the reel lock members 42 and 42' first come into contact with the front inclined portions 24a and 24a' of the cam ribs 24 and 24'. Thereafter, the control pins 48 and 48' are urged by the front inclined portions 24a and 24a' in such directions as to move toward each other. Accordingly, the reel lock members 42 and 42' are rotated in such directions that the lock pawls 49 and 49' formed at the front ends of the reel lock members 42 and 42' are moved toward each other. As a result, the lock pawls 49 and 49' are disengaged from the teeth 12 and 12' of the tape reels 8 and 8', thus unlocking the tape reels 8 and 8' as shown in FIGS. 6 and 7.

When the slide housing 25 reaches the rear stop position of its stroke, a rear surface 56 vertically extending from the lower end of the inclined surface 55 of the reel unlocking member 54 comes into abutment against the rear inner surface of the hollow portion 28 of the main portion 26 of the slide housing 25. This position of the slide housing 25 corresponds to an unlocked position, and the slide housing 25 is kept in this unlocked position.

Conversely, when the tape cassette 1 is unloaded from the VTR, the reel unlocking member 54 is retracted from the cassette case 2. Accordingly, the slide housing 25 is moved toward the locked position by the biasing force of the coil spring 41. During the frontward movement of the slide housing 25, when the control pins 48 and 48' of the reel lock members 42 and 42' come to the front inclined portions 24a and 24a' of the cam ribs 24 and 24' that is come to the intermediate position of the stroke of the slide housing 25, the lock pawls 49 and 49' come into engagement with the teeth 12 and 12' of the tape reels 8 and 8'. Thereafter, the slide housing 25 is further moved frontward to thereby rotate the tape reels 8 and 8' through the reel lock members 42 and 42' in the tape winding directions. Thereafter, the slide housing 25 reaches the locked position.

Figure 10:
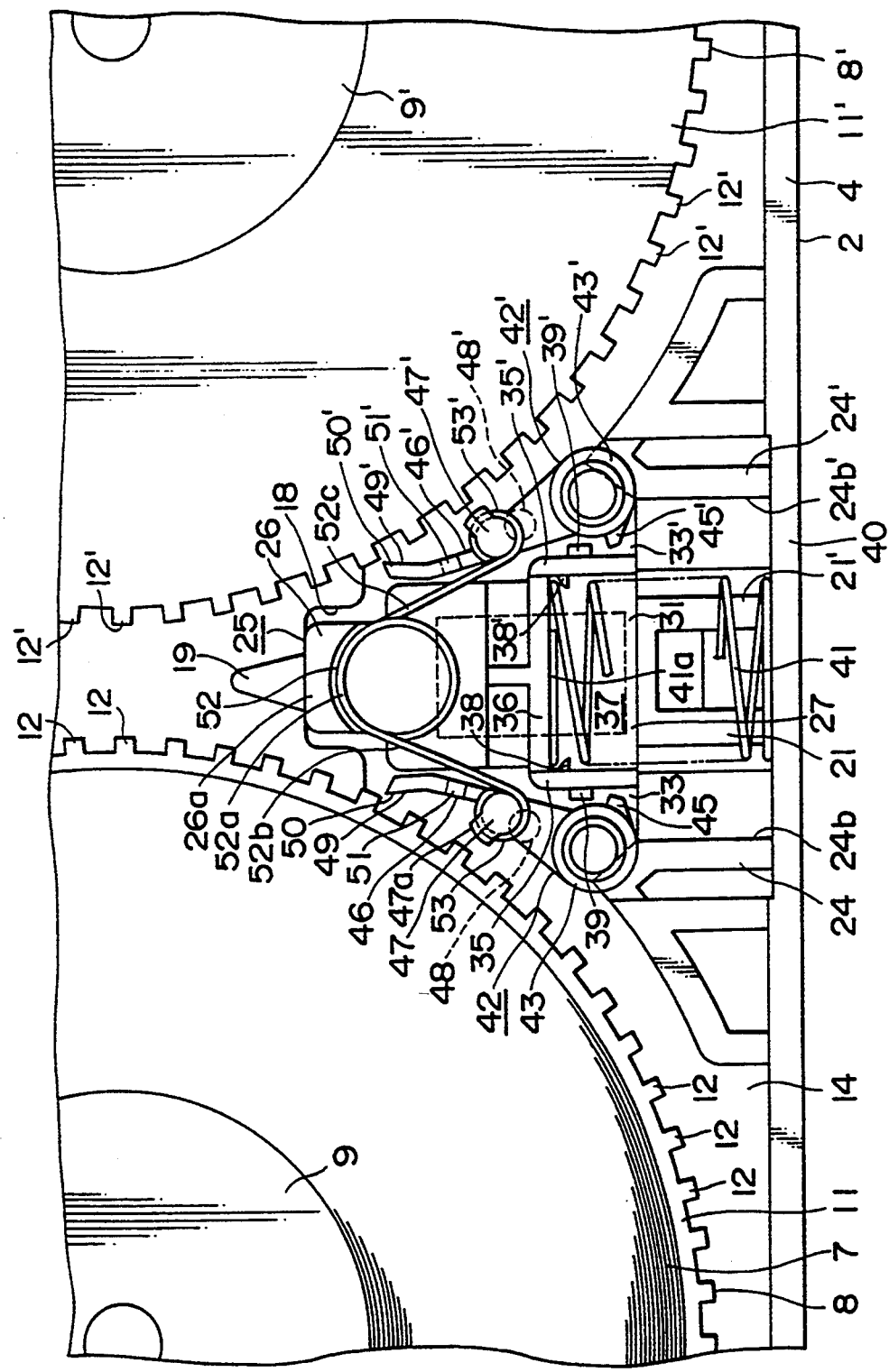
FIG. 10 is an enlarged plan view of the essential part in the condition where a force is applied to one of the tape reels in such a direction as to rotate it in a tape slackening direction.

In the locked position of the slide housing 25, when a force is applied to only the tape reel 8', for example, so as to rotate the same in a tape unwinding direction, or a tape slackening direction as shown in FIG. 10, only the reel lock member 42' engaging with the tape reel 8' is rotated in the unlocking direction, because the two reel lock members 42 and 42' are independently rotatably connected to the slide housing 25. Thus, there is no possibility that both the tape reels 8 and 8' may be unlocked at the same time as in the related art.

Rather than the maintenance of the locked condition of the other tape reel 8 by the reel lock member 42, the biasing force of the torsion spring 52 applied to the reel lock member 42 in the locking direction is increased by an amount of rotation of the reel lock member 42' in the unlocking direction.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A tape cassette comprising:
   a cassette case;
   a pair of reels rotatably mounted in said cassette case, each of said reels having a flange formed with an outer circumferential toothed portion;
   a magnetic tape wound around said reels and extending between said reels and across a front of said cassette case;
   a slide member slidable between said reels in a frontward direction and a rearward direction within said cassette case;
   a pair of support pins mounted on said slide member;

a pair of lock members independently rotatably mounted respectively on said support pins of said slide member for independently engaging said toothed portions of said reels, respectively, to lock rotation of said reels to prevent slackening of said magnetic tape;

a first spring for biasing said lock members to rotate toward engagement with said toothed portions of said reels;

a second spring for biasing said slide member to slide in said frontward direction to engage said lock members with said toothed portions;

a pair of cam members mounted in said cassette case for engaging and rotating said lock members toward disengagement from said toothed portions of said reels, respectively, against a biasing force of said first spring when said slide member is slid in said rearward direction; and wherein each of said lock members has a projection formed in the vicinity of a center of rotation thereof, and said slide member has a pair of stopper ribs for engaging said projections of said lock members, respectively, said ribs positioned to limit the biased rotation of said lock members in the respective biased directions.

2. A tape cassette according to claim 1, wherein said lock members are biased by said second spring through the movement of said slide member in such directions as to rotate said reels in opposite directions for winding of said magnetic tape onto said reels.

3. A tape cassette according to claim 2, wherein each of said lock members has a control pin projecting therefrom, and each of said cam members comprises a cam rib formed on a bottom wall of said cassette case, said control pin of said each lock member coming into contact with said cam rib and being guided thereon when said slide member is slid in said rearward direction, whereby said lock members are rotated to be disengaged from said toothed portions of said reels.

4. A tape cassette according to claim 3, wherein each of said lock members has a spring retainer engaging with said first spring, each spring retainer having a stop for holding said first spring in position.

5. A tape cassette according to claim 4, wherein said first spring comprises a torsion spring having a central coil portion and a pair of opposite ends, said central coil portion of said torsion spring being supported on said slide member, said opposite ends of said torsion spring being engaged with said spring retainers of said lock members, respectively.

6. A tape cassette according to claim 5, wherein said second spring comprises a coil spring interposed between said slide member and said cassette case under compression.

7. A tape cassette according to claim 6, further comprising guiding means for guiding a sliding movement of said slide member and a stopper for limiting said sliding movement of said slide member; said guiding means and said stopper being formed on said bottom wall of said cassette case.

8. A tape cassette according to claim 7, wherein said guiding means has a height substantially half that of said stopper.

9. A tape cassette according to claim 8, wherein said bottom wall of said cassette case has a through hole, and said slide member has a hollow portion opening to said through hole, so that unlocking means for sliding said slide member in said rearward direction to thereby unlock said lock members is inserted through said through hole of said cassette case into said hollow portion of said slide member.

10. A tape cassette according to claim 9, wherein said hollow portion has an inclined surface for coming into sliding contact with an inclined surface of said unlocking means, so that when said unlocking means is vertically moved, said slide member is moved in said rearward direction by the sliding contact between said inclined surfaces of said unlocking means and said hollow portion of said slide member.

* * * * *